(12) United States Patent
Lamm et al.

(10) Patent No.: US 6,219,599 B1
(45) Date of Patent: Apr. 17, 2001

(54) DEVICE AND PROCESS FOR ELECTRONIC MONITORING OF AN ADJUSTING DRIVE IN A VEHICLE

(75) Inventors: Hubert Lamm, Kappelrodeck; Guenter Haderer, Bühl, both of (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/171,453
(22) PCT Filed: Mar. 12, 1997
(86) PCT No.: PCT/DE97/00479
§ 371 Date: Aug. 20, 1999
§ 102(e) Date: Aug. 20, 1999
(87) PCT Pub. No.: WO97/39509
PCT Pub. Date: Oct. 23, 1997

(30) Foreign Application Priority Data

Apr. 17, 1996 (DE) ................................................ 196 15 123

(51) Int. Cl.$^7$ ................................. H02P 1/22; H02P 3/00
(52) U.S. Cl. ............................... 701/36; 701/49; 318/139; 318/286
(58) Field of Search ................................. 701/36, 35, 49; 318/286, 599, 139

(56) References Cited

U.S. PATENT DOCUMENTS

| | | | |
|---|---|---|---|
| 4,608,637 | * 8/1986 | Okuyama et al. | 364/424 |
| 4,736,144 | 4/1988 | Hsu | 318/467 |
| 4,749,193 | 6/1988 | Häcker | 296/107 |
| 4,870,333 | * 9/1989 | Itoh et al. | 318/286 |
| 5,084,658 | * 1/1992 | Nielsen et al. | 318/139 |
| 5,521,474 | 5/1996 | Hahn | 318/285 |
| 5,747,956 | * 5/1998 | Lamm | 318/599 |

FOREIGN PATENT DOCUMENTS

| | | |
|---|---|---|
| 34 13 380 | 10/1985 | (DE). |
| 40 20 351 | 1/1992 | (DE). |
| 43 39 365 | 5/1995 | (DE). |
| 2198860 | 6/1988 | (GB). |

* cited by examiner

Primary Examiner—William A. Cuchlinski, Jr.
Assistant Examiner—Tuan C To
(74) Attorney, Agent, or Firm—Kenyon & Kenyon

(57) ABSTRACT

An apparatus and a method for electronic monitoring of a positioning drive arranged in a motor vehicle are proposed, in which a processed speedometer signal is taken into account in an arrangement for making available at least one limit value of the closing force limiting system. This serves to prevent incorrect activation of the closing force limiting system.

10 Claims, 1 Drawing Sheet

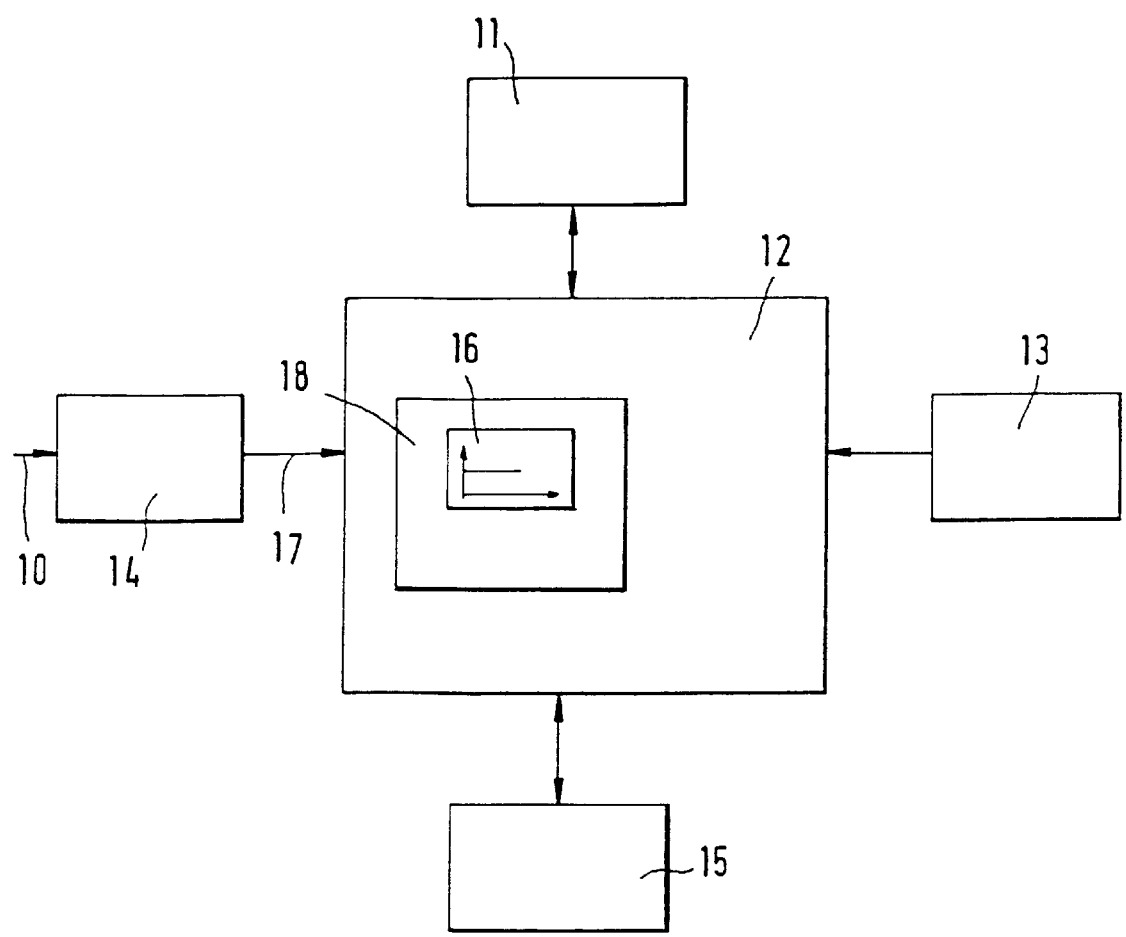

DEVICE AND PROCESS FOR ELECTRONIC MONITORING OF AN ADJUSTING DRIVE IN A VEHICLE

FIELD OF THE INVENTION

The present invention relates to an apparatus and a method for electronic monitoring of a positioning drive arranged in a vehicle.

BACKGROUND INFORMATION

German Patent No. 40 20 351 describes a method for electronically monitoring and controlling the opening and closing operation of electrically driven units, where acceleration forces, in particular those acting in the vertical direction, are sensed by a sensor to be installed additionally.

German Patent No. 34 13 380 also describes an apparatus for opening and closing a convertible top of a vehicle. At a vehicle speed >3 km/h, an inhibition signal is generated which immobilizes the drive system of the convertible top. A vehicle-speed-dependent limit value for a closing force limiting system is not, however, known.

SUMMARY OF THE INVENTION

The apparatus and method according to the present invention for electronic monitoring of a positioning drive arranged in a vehicle has the advantage that the limit value of a closing force limiting system is adapted, via a speedometer signal, to the speed-dependent force and pressure conditions. It is thereby possible to counteract the closing force limiting system from being activated by forces that occur at high speeds, without jamming and without having to eliminate closing force monitoring. A further advantage is that of not needing to fall back upon a signal of a sensor to be installed additionally.

Simple to implement advantageously is the consideration of a binary state, i.e., whether the vehicle is moving or stationary.

Another exemplary embodiment provides for a quantized speedometer signal which supplies detailed information concerning the movement state of the motor vehicle.

The apparatus and method for electronic monitoring of a positioning drive arranged in a vehicle are preferably used in power windows, and prevent incorrect activations due to vibratory motions. In sun roofs, the speed-dependent closing force limiting system takes into account the changing pressure conditions in the lifting range, and thus also reduces the risk of improper activation.

BRIEF DESCRIPTION OF THE DRAWING

The FIGURE shows an exemplary embodiment of an apparatus according to the present invention.

DETAILED DESCRIPTION

An electronic control system 12 contains an arrangement 18 for making available at least one limit value of a closing force limiting system which generates a limit value 16 of the closing force limiting system. A processed speedometer signal 17 which is constituted by a vehicle speed processor 14 from a speedometer signal 10, as well as signals which are generated by an external sensor apparatus 13, a positioning drive 15, and control elements 11, flow into electronic control system 12. Electronic control system 12 delivers signals to control elements 11 and to positioning drive 15.

The arrangement shown in the FIGURE operates as follows:

Electronic control system 12 is informed via control elements 11 of the desired operating mode, for example closing of a sun roof. The electronic control system checks whether a criterion for jamming is present, i.e. whether limit value 16 ascertained by arrangement 18 in order to make available at least one limit value 16 of the closing force limiting system reaches or exceeds the actual value. If electronic control system 12 has detected that positioning drive 15 is jamming, positioning drive 15 is then stopped or reversed. This is intended to prevent injury to a person present in the closing region, or damage to positioning drive 15. In this context, specific situations may lead to improper activations if, for example, large forces act briefly on positioning drive 15. This might be the case at high speeds if the sun roof is in the lifted position, or in the presence of vibratory motions caused by road surface irregularities.

These incorrect activations are reduced by taking into account external influences by way of processed speedometer signals 17 when ascertaining limit value 16.

Vehicle speed processor 14 uses speedometer signal 10 as an input variable, and depending on the embodiment delivers a continuous, binary or quantized, processed speedometer signal 17. The binary processed speedometer signal 17 changes logical state if an adjustable threshold value is exceeded. For a simple circuit configuration, it is advantageous to distinguish between the states in which the vehicle is stationary or moving, so as to define a higher limit value 16 of closing force limiting system when the vehicle is moving than when it is stationary, since in the latter case the forces acting on positioning drive 15 are smaller. For a more accurate determination of limit value 16 of the closing force limiting system, speedometer signal 10 can be quantized to any degree of fineness, and in the most accurate case one limit value 16 of the closing force limiting system is associated with each quantizing step. This results in exact matching of limit value 16 of the closing force limiting system, which is adapted to the speed-dependent force and pressure conditions of the vehicle components to be actuated by positioning drive 15. The use of the electronic monitoring system of positioning drive 15 for opening and closing is advantageous in particular for a sun roof system and for a power window system. In addition, the present invention is suitable for positioning drives of outside mirrors and antennae.

Today, speedometer signal 10 is available in any case, The outlay for additionally taking speedometer signal 10 into account in electronic control system 15 is therefore low.

What is claimed is:

1. An apparatus for an electronic monitoring of a positioning drive, the positioning drive being arranged in a vehicle, comprising:

an electronic control system controlling the positioning drive;

a speed processor determining a speed of the vehicle, the speed processor generating a processed speedometer signal as a function of the speed; and an arrangement providing at least one limit value of a closing force limiting system, the arrangement correcting the at least one limit value as a function of the processed speedometer signal.

2. The apparatus according to claim 1, wherein the processed speedometer signal is determined in a binary manner using a threshold value, and wherein the arrangement corrects the at least one limit value as a function of the processed speedometer signal.

3. The apparatus according to claim 1, wherein the processed speedometer signal is determined in a quantized manner using a quantizing process, and wherein the arrangement corrects the at least one limit value as a function of the processed speedometer signal.

4. The apparatus according to claim 1, wherein a sun roof of the vehicle includes the apparatus.

5. A method for an electronic monitoring of a positioning drive using an apparatus, the positioning drive being arranged in a vehicle, the apparatus including an electronic control system, a speed processor and an arrangement, comprising the steps of:

provic at least one limit value of a closing force limiting system using the arrangement;

determining a speed of the vehicle using the speed processor;

generating a processed speedometer signal as a function of the speed using the speed processor; and correcting the at least one limit value using the arrangement as a function of the processed speedometer signal.

6. The method according to claim 5, further comprising the steps of:

determining the processed speedometer signal in a binary manner using a threshold value; and correcting the at least one limit value as a function of the processed speedometer signal using the arrangement.

7. The method according to claim 5, further comprising the steps of:

determining the processed speedometer signal in a quantized manner using a quantizing process; and correcting the at least one limit value as a function of the processed speedometer signal using the arrangement.

8. The method according to claim 5, wherein the apparatus is included in a sun roof of the vehicle.

9. The apparatus according to claim 1, wherein the electronic control system checks whether a criterion for jamming is present as a function of the at least one limit value.

10. The method according to claim 5, further comprising:

detecting a jamming condition as a function of the at least one limit value.

* * * * *